United States Patent
Filippov

(10) Patent No.: US 10,638,109 B2
(45) Date of Patent: Apr. 28, 2020

(54) METHOD FOR THE FPGA-BASED LONG RANGE MULTI-VIEW STEREO WITH DIFFERENTIAL IMAGE RECTIFICATION

(71) Applicant: Elphel, Inc.

(72) Inventor: Andrey Filippov, Magna, UT (US)

(73) Assignee: Elphel, Inc., West Valley City, UT (US)

( * ) Notice: Subject to any disclaimer, the term of this patent is extended or adjusted under 35 U.S.C. 154(b) by 0 days.

(21) Appl. No.: 16/132,343

(22) Filed: Sep. 14, 2018

(65) Prior Publication Data

US 2019/0098283 A1    Mar. 28, 2019

Related U.S. Application Data

(60) Provisional application No. 62/559,426, filed on Sep. 15, 2017.

(51) Int. Cl.
  *G06K 9/64*    (2006.01)
  *G06T 7/70*    (2017.01)
  (Continued)

(52) U.S. Cl.
  CPC ......... *H04N 13/133* (2018.05); *G06K 9/6202* (2013.01); *G06T 5/006* (2013.01);
  (Continued)

(58) Field of Classification Search
  CPC .... H04N 13/133; H04N 13/246; H04N 13/15; H04N 13/243; H04N 13/111;
  (Continued)

(56) References Cited

U.S. PATENT DOCUMENTS

| | | | | |
|---|---|---|---|---|
| 5,448,053 A | * | 9/1995 | Rhoads | G01J 9/00 250/201.9 |
| 6,344,640 B1 | * | 2/2002 | Rhoads | G01J 9/00 250/201.9 |

(Continued)

OTHER PUBLICATIONS

Furukawa et al., "Accurate Camera Calibration from Multi-View Stereo and Bundle Adjustment"—IEEE—Jun. 23-28, 2008 (Year: 2008).*

*Primary Examiner* — Philip P. Dang
(74) *Attorney, Agent, or Firm* — Thorpe North & Western

(57) ABSTRACT

The proposed method allows to obtain long range data for the objects that are registered with image disparities of just a few pixels, supplementing conventional multi-view stereo (MVS) methods optimized for larger disparity values. This method uses at least four identical image sensing devices with parallel optical axes and located in the corners of a square providing orthogonal baselines for the imager pairs of the equal length. Image enhancement and processing is based on 2-d complex lapped transform (CLT), this method achieves subpixel disparity resolution with frequency-domain differential rectification avoiding resampling of the rectified images. CLT has efficient FPGA implementations with discrete cosine (DCT) and sine (DST) transforms. FPGA-based tile processor (TP) outputs data for the disparity space image (DSI), textures, data for field calibration and velocity measurements with electronic rolling shutter image sensors.

4 Claims, 2 Drawing Sheets

(51) Int. Cl.
| | |
|---|---|
| *H04N 13/128* | (2018.01) |
| *H04N 13/133* | (2018.01) |
| *H04N 13/246* | (2018.01) |
| *H04N 13/15* | (2018.01) |
| *H04N 13/243* | (2018.01) |
| *H04N 13/111* | (2018.01) |
| *G06T 7/90* | (2017.01) |
| *G06T 5/00* | (2006.01) |
| *G06T 5/50* | (2006.01) |
| *G06K 9/62* | (2006.01) |
| *H04N 13/00* | (2018.01) |

(52) U.S. Cl.
CPC .................. *G06T 5/50* (2013.01); *G06T 7/90* (2017.01); *H04N 13/111* (2018.05); *H04N 13/15* (2018.05); *H04N 13/243* (2018.05); *H04N 13/246* (2018.05); *G06T 2207/20056* (2013.01); *G06T 2207/20216* (2013.01); *H04N 2013/0081* (2013.01)

(58) Field of Classification Search
CPC .......... H04N 2013/0081; G06K 9/6202; G06T 2207/20056; G06T 2207/20216; G06T 7/90; G06T 5/006; G06T 5/50
See application file for complete search history.

(56) References Cited

U.S. PATENT DOCUMENTS

| | | | | |
|---|---|---|---|---|
| 6,429,415 B1* | 8/2002 | Rhoads | ........... | G01J 9/00 250/201.9 |
| 7,162,397 B2* | 1/2007 | DeCarlo | ........... | G01L 23/085 363/45 |
| 7,242,710 B2* | 7/2007 | Ekstrand | ........... | H03H 17/0266 375/232 |
| 7,272,265 B2* | 9/2007 | Kouri | ........... | G06K 9/00516 382/260 |
| 7,286,927 B2* | 10/2007 | DeCarlo | ........... | G01L 23/085 701/114 |
| 7,415,117 B2* | 8/2008 | Tashev | ........... | H04R 3/005 367/119 |
| 7,626,154 B2* | 12/2009 | Sei | ........... | H04N 9/093 250/208.1 |
| 7,847,362 B2* | 12/2010 | Ogino | ........... | H01L 27/14601 257/436 |
| 7,986,265 B2* | 7/2011 | Alexander | ........... | G01S 19/53 342/357.36 |
| 8,049,797 B2* | 11/2011 | Machida | ........... | H04N 9/045 348/272 |
| 8,218,963 B2* | 7/2012 | Adelsberger | ........... | G03B 15/03 362/16 |
| 8,406,270 B2* | 3/2013 | Brunner | ........... | H04L 25/0222 367/135 |
| 8,797,400 B2* | 8/2014 | Rinner | ........... | G06T 7/33 348/117 |
| 8,818,002 B2* | 8/2014 | Tashev | ........... | G01S 3/86 381/92 |
| 8,873,813 B2* | 10/2014 | Tadayon | ........... | G06K 9/00 382/118 |
| 8,902,308 B2* | 12/2014 | Rinner | ........... | G06T 7/33 348/117 |
| 9,054,764 B2* | 6/2015 | Tashev | ........... | H04B 7/0854 |
| 9,076,059 B2* | 7/2015 | Leung | ........... | G06K 9/3241 |
| 9,136,979 B2* | 9/2015 | Kamiya | ........... | H04L 27/3836 |
| 9,214,040 B2* | 12/2015 | Smolic | ........... | G06T 15/20 |
| 9,232,203 B2* | 1/2016 | Sawada | ........... | H04N 9/045 |
| 9,251,598 B2* | 2/2016 | Wells | ........... | H04N 7/181 |
| 9,402,049 B2* | 7/2016 | Matsui | ........... | H04N 5/772 |
| 9,524,426 B2* | 12/2016 | Kim | ........... | G06K 9/00369 |
| 2015/0094082 A1* | 4/2015 | Gupta | ........... | H04L 25/0204 455/456.1 |
| 2015/0294143 A1* | 10/2015 | Wells | ........... | G06K 9/00369 348/159 |
| 2015/0294496 A1* | 10/2015 | Medasani | ........... | H04N 7/181 348/159 |
| 2016/0191889 A1* | 6/2016 | Son | ........... | H04N 5/3572 382/154 |
| 2019/0287266 A1* | 9/2019 | Takahashi | ........... | G06T 7/74 |

* cited by examiner

METHOD FOR THE FPGA-BASED LONG RANGE MULTI-VIEW STEREO WITH DIFFERENTIAL IMAGE RECTIFICATION

RELATED APPLICATIONS

This application claims the benefit of U.S. provisional patent application No. 62/559,426, filed on Sep. 15, 2017.

FIELD OF THE INVENTION

The invention relates to the passive (visual) means of long range distance estimation and 3d reconstruction of dynamic scenes, applicable to autonomous vehicle navigation and visual odometry.

BACKGROUND

Most recent advances in the area of the 3d scene reconstruction are related to the structure from motion (SfM) where 3d information is extracted from a plurality of the images of the scene taken from different locations at different times, such as from video sequence. Another popular method use laser-based light detection and ranging (LIDAR) for distance measurements and the range data is combined with conventional high resolution 2d images during post-processing. Both methods are not suitable (or are of limited use) for dynamic scenes such as required for the autonomous vehicle navigation as different parts of the scene are sampled at different times. Being active (laser light is emitted by the system) LIDAR method additionally consumes more power and reveals the location of the scanning device that may be unwanted.

What remains is probably the oldest method of ranging that evolved in living organisms including humans—narrow baseline multi-view stereo (MVS), usually binocular. This approach was used in military rangefinders for a long time, there are many binocular cameras available. The main challenge for such visual ranging is the low distance precision when the distance to the object is hundreds and thousands times larger, than the baseline. "Accurate range estimates for objects that are a kilometer away, however, requires a 10 m baseline" [Fields, John Richard, James Russell Bergen, and Garbis Salgian. "System and method for providing mobile range sensing." U.S. Pat. No. 8,428, 344. 23 Apr. 2013]—such long baselines rangefinders were available on WWII warships, but are not practical for the autonomous vehicle navigation. Another challenge is that image matching may be difficult for poorly textured objects of low contrast, linear features parallel to the baseline are also virtually undetectable.

On the other hand matching of the long-range/short baseline images is simpler than those acquired with the long baseline MVS as there is less perspective distortions between the individual images and ranged objects maybe considered fronto-parallel in most cases. Matching of almost identical images may be efficiently handled by the fixed-window correlation such as phase-only correlation (PoC) [Nagashima, Sei, et al. "A subpixel image matching technique using phase-only correlation." *Intelligent Signal Processing and Communications, 2006. ISPACS'06. International Symposium on*. IEEE, 2006.]. PoC may be efficiently implemented in the frequency domain and is used for video-compression for motion vector estimation [Kresch, Renato, and Neri Merhav. "Method and apparatus for performing motion estimation in the DCT domain." U.S. Pat. No. 6,611,560. 26 Aug. 2003.]

Additional challenge for the MVS systems with subpixel accuracy that use modern high-resolution sensors is handling of the lens optical distortions and aberrations that reduce image resolution, especially in the off-center areas. Effect of the optical aberrations may be reduced by the space-variant image deconvolution [Harmeling, Stefan, et al. "Method and device for recovering a digital image from a sequence of observed digital images." U.S. patent application Ser. No. 13/825,365.].

Image distortions along do not reduce resolution, but they usually require image rectification to the common rectilinear projection before matching. The process of rectification involves pixel re-sampling, and that either reduce image quality by adding re-sampling noise or require up-sampling and increased computational resources and memory requirements.

It is therefore an object of the invention to improve resolution of long-range MVS, increase robustness of the method for the poorly textured objects, provide means for optical aberrations correction and avoid image re-sampling while finding solution that can be efficiently implemented in FPGA for real-time applications.

DETAILED DESCRIPTION

Definitions

Figure 1:
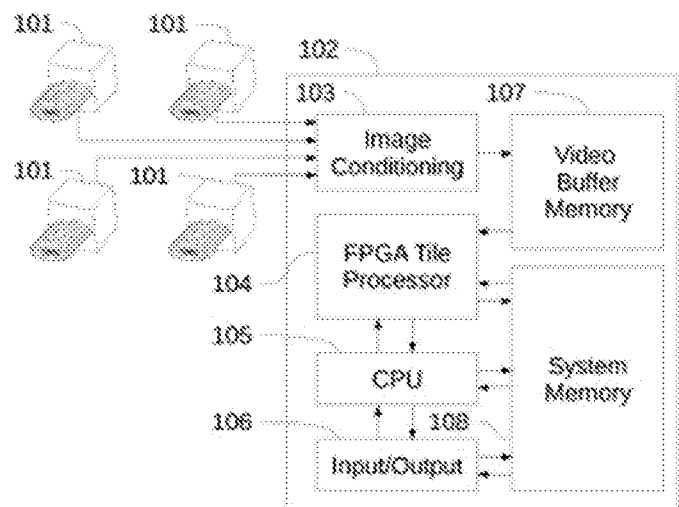
FIG. 1 illustrates a typical embodiment of the long range multi-view quad camera system with FPGA tile processor.

Central processing unit (CPU) herein means a general purpose processor for executing software programs.

Complex lapped transform (CLT) is a lapped transform that explicitly represents the phase (complex values) of the signal. Lapped transforms in image processing allow seamless processing of large images by independently performing operations on smaller fixed-size windows. CLT can be implemented using DCT and DST of smaller size and preserves convolution-multiplication property that is not generally valid for the DCT and DST themselves.

Convolution-multiplication property or Convolution theorem for Fourier transform states that under certain conditions Fourier transform of the convolution of the two functions is equal to the product of the transforms of the individual functions and thus provides efficient way to calculate convolutions and correlations, including multi-dimensional functions. Same is applicable to discrete Fourier transforms and some other transforms, such as CLT used here.

Digital signal processor (DSP) herein means a specialized FPGA block optimized for implementing digital signal processing functions such as DCT and DST. Contains at least one multiplier, several adders and registers.

Discrete cosine transform (DCT) and discrete sine transform (DST) express a finite sequence of data points in terms of a sum of cosine functions (for DCT) and sine functions (for DST) oscillating at different frequencies. Depending on the boundary conditions—odd/even continuation, full/half data interval between the border and the first/last sample there are 16 variants of each of the DCT and DST. These variations are called "types", and designated with roman numerals after the dash, so DCT-II means "discrete cosine transform of type 2" and DST-IV is "discrete sine transform type 4". These transforms have efficient FPGA implementations, use less resources than Discrete Fourier Transform, and are used in image and video compression algorithms, such as JPEG.

Disparity space image (DSI) is a function over pixel coordinates x, y and disparity d that represents confidence that this (x, y, d) triplet corresponds to a real object in the 3d world space.

Ego-motion is a 3D motion of a camera within an environment.

Electronic rolling shutter (ERS) refers to the image sensors where scan lines are exposed and sampled at different (progressive) times. ERS image sensors have better sensitivity and lower noise than snapshot shutter (simultaneous exposure) sensors of the same size, but exhibit specific geometric distortions of the images of the moving objects or when camera itself is moving.

Field-programmable gate array (FPGA) is an integrated circuit designed to be configured by a customer or a designer after manufacturing. Here it is essential that in addition to universal gates FPGA embeds DSP and memory blocks.

Frequency domain here refers to the image processing of the image tiles after applying discrete Fourier or similar transform to use convolution-multiplication property. Here it more specifically refers to the CLT.

Image rectification is a transformation process used to project two or more images onto a common image plane. Differential rectification here means image transformation to a common distorted image plane using small individual image transformations that are absorbed by the deconvolution for the lens aberration correction and is performed in the frequency domain.

Multi-view stereo (MVS) is the general term given to a group of techniques that use stereo correspondence as their main cue and use two or more images.

Phase-only correlation (POC), also referenced as phase correlation—is a method of the cross-correlation of the images performed in the frequency domain by preserving only phase information of the complex-valued data.

Point spread function (PSF) describes the response of an imaging system to a point source or point object. Space-variant PSF refers to the case when the recorded image can not be presented as a convolution of the non-distorted image and the PSF of the lens (usual case when aberrations in off-center area are stronger than in the center of the image), but that principle still stays locally, as the convolution kernel (PSF) only slowly varies over the image plane.

System on chip (SoC) is an integrated circuit that integrates all components of a computer or other electronic systems. Here it is essential that SoC integrates CPU and FPGA providing high bandwidth communication channels between the two and shared access to the system memory.

Voxel represents a value on the three-dimensional grid. DSI voxel represents a value on the grid of the two-dimensional image pixels supplemented with the image disparity quantized to available subpixel resolution.

Typical embodiment presented on FIG. 1 includes four practically identical image sensing devices 101 having low distortion lenses with preselected focal lengths, with parallel axes, and located in the corners of a square perpendicular to the common camera axis. Four orthogonal baseline camera pairs are "top", "bottom", "right", and "left" with image sensor scan lines oriented parallel to the top and bottom pairs. In contrast with the majority of the MVS methods that depend on the full image rectification to the common rectilinear view, the proposed method involves only a small differential rectification of the individual images to the common radially distorted view of the virtual center image. That allows the use of the hardware-efficient image processing with fixed window (may be 16×16 pixels overlapped) CLT that is routinely used for video compression. This imposes requirement of the low distortion lenses—as the correlation involves shifting proportional to measured disparity, the far objects (near zero shift) that are essential to this method applications will be processed correctly, geometrical distortions would limit the upper limit of the possible disparities, so the lower are distortions of the lenses—the higher is the useful disparity range.

The optical system is factory calibrated, and with bundle adjustment the common intrinsic parameters are calculated and are available in the system at runtime. Individual geometrical deviations of the individual images from the common distortion model are measured and combined with the lens aberration (such as lateral chromatic aberration) calibration and converted to the frequency domain space-variant CLT deconvolution kernels that are also available at run-time as calibration data. These kernels have center shift removed and encoded separately as a pair of fractional pixel X and Y values.

The typical processing system 102 is based on a SoC that provides FPGA fabric and a general purpose CPU 105, sharing high-bandwidth data channels. It contains a 4-channel image acquisition and condition module 103 (implemented in the FPGA) that interfaces image sensors and stores 4 Bayer mosaic (raw) images in the external high density video buffer memory 107. The same memory (it is FPGA-dedicated memory and is not shared with the CPU) is used to store the calibration data including CLT-domain deconvolution kernels.

Image processing and 3d reconstruction is performed cooperatively by the FPGA that performs DSP operations on the pixel tiles (such as 16×16 pixels overlapping) and the CPU that runs flexible higher level algorithms that interact with the FPGA on the tile level, does not have to deal with the individual pixels. That offloads the CPU and greatly reduces processing requirements.

FPGA tile processor 104 operates on the tile task lists it reads from the system memory 108 (shared with the CPU), these lists are prepared by the software before the tile processor starts the next "scan" (processing a list of tiles). When operating on the requested tiles, tile processor reads deconvolution kernels and image data from the video memory, and transfers results to the system memory. Standard input/output subsystem 106 of the SOC is used to record or transmit image processing results to other devices.

Figure 2:
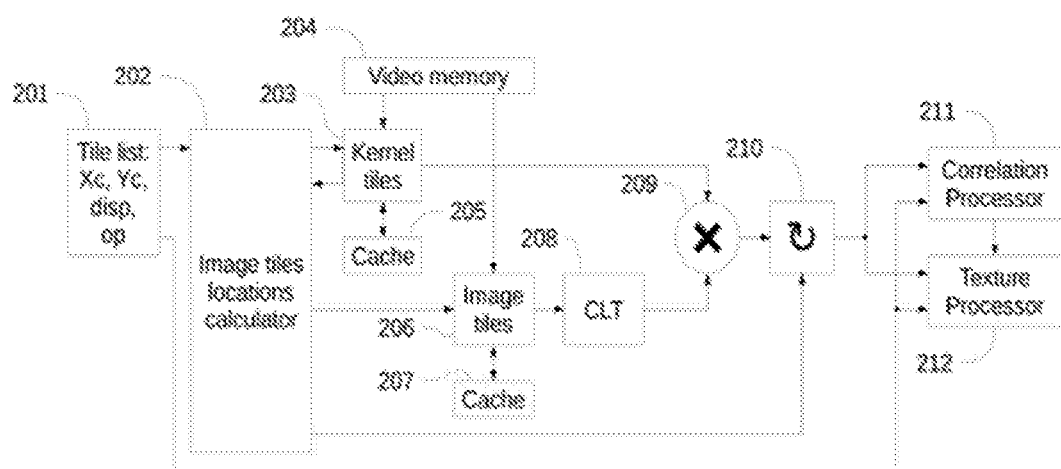
FIG. 2 is a block diagram of the FPGA-based tile processor.

Tile processor operation is illustrated by FIG. 2. It reads processing instructions from the system memory, each tile data 201 contains fractional pixel location of the tile center Xc, Yc in the virtual center image, nominal disparity (disp) of the tile center and operation code (op) to perform. Each tile is processed almost independently from the other ones, with the only exception that the image and kernel data may be cached (205, 207) as the nature of overlapping tiles assumes that the same image pixel contributes to the 4 neighbor tiles.

Tile processor performs similar operations on multiple images (and individual color channels of each image) and there are multiple configurations possible to balance performance, processing time and hardware resources.

Processing starts with calculation of the four tiles Xi, Yi centers 202 for the individual images, considering Xc, Yc, disp and common distortion parameters of the virtual center image. For the CMOS electronic rolling shutter (ERS) sensors it is possible to compensate ERS distortions if the relative to the camera movement of the image is known from inertial sensors or measured from horizontal-to-vertical pairs comparison as explained below for 313.

Xi, Yi determine deconvolution kernel to load from the calibration array in the video memory 204, and the data is read by the 203 using cache 205. The kernel data includes four CLT 8×8 pixel slices of 2d DCT-II/DCT-II, DCT-II/DST-II, DST-II/DCT-II and DST-II/DST-II (first part of the designation before slash is either 8-pixel one-dimensional discrete cosine transform type II or discrete sine transform type II for the horizontal pass, second—same for the vertical). This data is calculated during calibration and provided at runtime as read-only data, optional low-pass filters (LPF) are applied to the output during calculation. Kernel data also contains kernel center X/Y offsets, these offsets are added to Xi, Yi (individually for each color as they may be different in the case of the chromatic aberrations) and split into the rounded integer and residual fractional values in the range of [−0.5, 0.5) pixels. Integer parts are used to read image tiles 206 from the video memory (with cache 207), fractional parts are preserved to be applied later to 210.

Read-in (or retrieved from the cache) image tile data passes through the direct 16×16 two-dimensional CLT, implemented with DCT-IV and DST-IV, resulting in the four 8×8 slices: DCT-IV/DCT-IV, DCT-IV/DST-IV, DST-IV/DCT-IV and DST-IV/DST-IV.

With both image and kernel data available in the frequency (CLT) domain they are subject to the complex multiplication by 209. At this stage the fractional pixel shift is applied to the data as a phase rotator by multiplying by appropriate sine and cosine functions. It is possible to change the order of multiplication and apply shift to the kernels.

At this point there are 12 of frequency domain complex-valued tiles (4 cameras, 3 color channels each) available for farther processing. Depending on the requested tile operation, this data is fed to the correlation processor 211, texture processor 212, or both.

Figure 3:
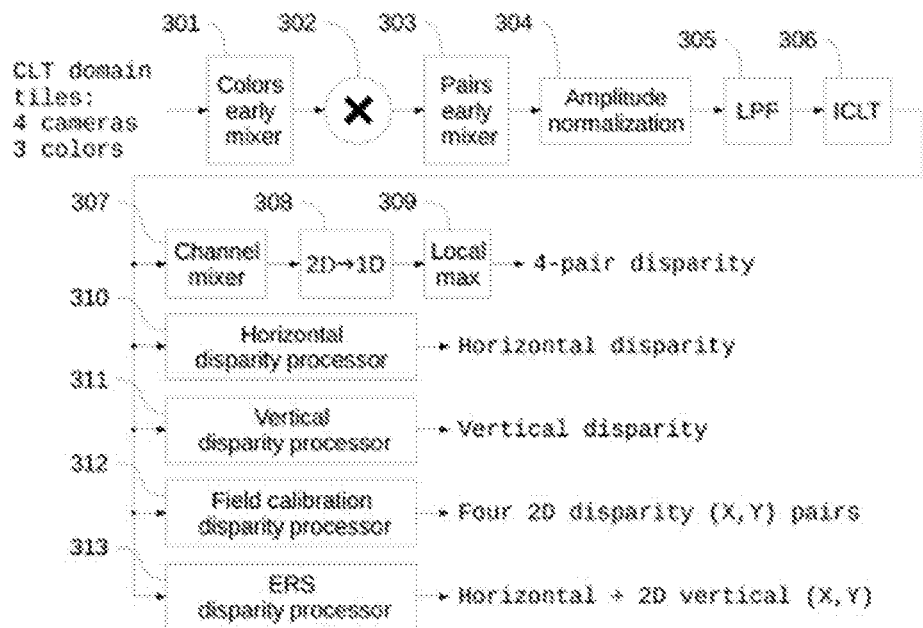
FIG. 3 is a block diagram of the correlation processor part of the tile processor (FIG. 2) that calculates tiles disparity, separate horizontal and vertical disparities, data for field pose calibration and velocity measurements.

FIG. 3 provides details of the possible correlation processor implementations. Most MVS algorithms reduce 2d correlation to one dimensional correlation along the epipolar lines, while the current method uses 2d correlation, because the input data is already available in the frequency domain, and correlation is implemented as a complex multiplication before converting back to the pixel domain, making use of the convolution-multiplication property which is valid for the CLT.

Depending on the application requirements it is possible to balance performance and computational resources. First such choice is to either reduce 3 color channels of each of the 4 images to just intensity before multiplying pairs with early color mixer 301 and perform 4 tile pairs complex multiplications, or bypass 301, and calculate 12 such multiplications, then mix results of per-color multiplication 309 later in the processing chain. In the later case the image pair matching is more robust as it uses color information at the expense of increased number of required arithmetic operations.

Next fork is after multiplication of monochrome image pairs or merging results of the per-color multiplications. There are now four sets of the complex valued tiles, representing four frequency-domain image pairs correlation data. If 1) only 4 pair disparity result is needed and 2) just averaging quality is sufficient, it is possible to combine by complex addition all 4 pairs into a single complex tile in the pairs early mixer 303. Here equality and orthogonality of the baselines (arrangement of the individual images 101 in the corners of a square) is used—two horizontal pairs (top and bottom) are added directly, two vertical (right and left) require just matrix transposition (swapping X and Y) instead of the tile arbitrary angle rotation. In addition to combining all 4 correlation results into one and preserving them intact it is possible to reduce their number from four to two: separately merge two horizontal and 2 vertical pairs—that is suitable for all but field calibration applications.

Next steps of the correlation processing are amplitude normalization 304 required to calculate phase-only correlation (POC) from the normal cross correlation available in the frequency domain as the result of the complex multiplication, processing by the low-pass filter 305 and converting to the pixel domain with inverse CLT 306 that uses DCT-II/DST-II transforms. Intermediate results at this stage contain 1, 2 or 4 of the pixel domain real-valued 16×16 tiles of the correlation data that is used to calculate some (or all) of the tile output values. All produced disparity values are additional to the pre-programmed tile disparity fed to the 202, so full disparity (inverse proportional to the distance to the objects) is a sum of the pre-programmed value and value output from the correlation processor.

Combined from four image pairs disparity value and disparity confidence constitute the main result used for the disparity space image (DSI) generation. This data is calculated in the following sequence: data goes though the channel mixer 307 (bypassed if the channels are already combined in 303), where the channels may be offset-multiplied (multiplied after adding a parameter) to select between just averaging that is prone to false-positives, and the pure multiplication that is more influenced by the signal noise. Two dimensions to one dimension conversion 308 is achieved by filtering—discarding data away from the center Y=0 line (or multiplied a window function), and then calculation of the sums of values for each X value. Next the disparity is calculated as the local maximum using windowed center of mass or polynomial approximation to subpixel resolution by 309. The POC value at the local maximum is also output and is used as a measure of disparity confidence, related to the probability for the tile to have the output disparity.

Horizontal 310 and vertical 311 disparity processors are useful to detect vertical and horizontal foreground features over textured background. They are similar to the 307-308-309 chain, but may have a notch filter (suppress POC values near Y=0) to reduce influence of the background texture.

Field calibration disparity processor 312 preserves both Y and X position of the POC maximum for each of the 4 image pairs (total 8 values). These values may be used to detect "lazy eye" condition for the image pairs and calculate individual imagers pose correction if misalignment is developed after the factory calibration.

ERS disparity processor 313 can detect and measure specific to ERS pairs mismatch. As the sensor scanlines are oriented along the horizontal baselines, each of the horizontal sensor pairs is not influenced by this effect—local maximum Y offsets are zero and the X offsets (combined with pre-programmed disparity) correctly match the distance to the object. Vertical pairs, on the other hand match tiles that were acquired at slightly different (but known) times. So difference between the 2d location of the POC maximum of the combined vertical pairs and that calculated for the combined horizontal pairs provides a 2d vector of how much did the object move perpendicular to the camera axis during known time interval. The value is in pixels, but as the disparity value is also known it is possible to calculate the absolute velocity projection. This movement maybe caused by either moving of the captured object, or by the camera ego-motion, or both.

Figure 4:
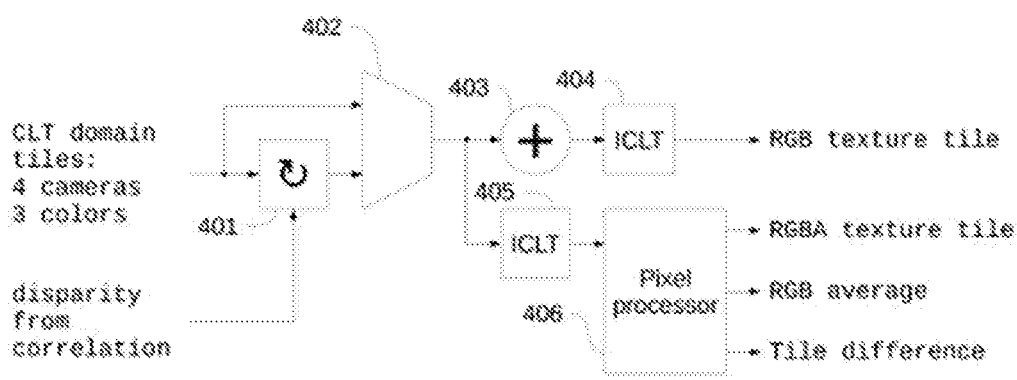
FIG. 4 is a block diagram of the texture processor part of the tile processor (FIG. 2) that combines individual images into a texture tile (RGB or RGBA) and provides aggregate values of the image tiles matching.

FIG. 4 demonstrates texture processor module of the FPGA tile processor. It combines individual images into a single texture tile and/or aggregated tile values. Input data is shared with the correlation module—it contains 12 complex frequency-domain tiles—3 color channels for each of the four images.

Phase rotator 401 optionally applies fractional image shift according to the disparity calculated in the correlation module. Multiplexer 402 selects between images shifted only by the pre-programmed disparity or pre-programmed plus calculated from correlation disparity, depending on the requested tile operation. If alpha channel is not needed then the 4 images are combined (averaged) in 403 before inverse CLT and sent to output, otherwise each of the 4 frequency-domain image tiles (with aberrations corrected and fractional shift applied) are converted to pixel domain in 405. This data goes through the pixel processor 406 and several values are calculated: texture RGB values are calculated by averaging only those image pixels that match with certain tolerance, alpha channel masks out pixels that do not match in all channels. In addition to the output textures several tile parameters are calculated: average RGB value for the tile and measure of the tile difference between each individual image and the combined one (average texture).

Sums of the squared differences (SSD) between texture pixels (averaged) and those of the four images (4 values per tile) are output from the module. These values provide software with a hint that there may be something there if the corresponding tiles are processed with different disparity shift. This data may be used to calculate a second level super-tiles (16×16 tiles corresponding to 128×128 image pixels) where first level tile (16×16 pixels) SSD values are used instead of the pixels. These super-tiles are processed by the same (or identical) tile processor resulting in coarser but smaller disparity space image that is much faster to calculate, and then only occupied voxels need to be processed at the pixel level.

The invention claimed is:

1. A method of a differential image rectification for a purpose of an image matching in multi-view stereo systems, comprising:
calibrating a multi-view stereo system and extracting a common average distortion of individual images approximated by a radial distortion model with a coefficient determined by a bundle adjustment;
recording each individual image distortion difference from the said radial distortion model;
combining each image distortion difference with a space-variant point spread function (PSF) of each individual image, each color channel into a composite PSF;
finding a center of the each PSF and extracting X and Y center coordinates of offsets including fractional pixels, storing these coordinates for a runtime application;
inverting each PSF for a purpose of a deconvolution;
converting an inverted space-variant PSF to a frequency domain using a complex lapped transform (CLT);
applying a low-pass filter with a cutoff frequency matching each color frequency in a Bayer color mosaic of an image sensor, wherein the color frequency is lower for red and blue colors, and is higher for a green color;
storing result CLT frequency domain kernels for the runtime application;
when performing the image matching at runtime, calculate each image tile center using requested center image coordinates and a nominal disparity, image extrinsic corrections, electronic rolling shutter corrections;
retrieving of corresponding deconvolution kernels and their offsets;
adding the offsets to coordinates of the calculated image tile centers and retrieving of image tiles according to integer parts of the offset added results;
performing 2d CLT on the retrieved image tiles;
performing a complex multiplication between converted image tiles and deconvolution kernels;
applying a phase rotator to the result multiplication by sine and cosine functions with frequencies defined by fractional parts of the added offsets;
proceeding additional frequency-domain image processing operations including a phase-only correlation and a texture extraction.

2. The method according to claim 1 further comprising a method of a multi-view stereo with four identical parallel-oriented cameras located in the corners of a square providing four images that can be grouped in four pairs with equal baseline lengths aligned along two orthogonal directions, one of which coincides with image sensor scan lines and plurality of all or some of correlation-based processing methods:
extracting a common disparity and disparity confidence values by locating a local maximum of combined correlation data where horizontal pairs are combined directly, and vertical pairs are transposed before combining, wherein X and Y coordinates of a tile being swapped during the transposed operation;
extracting a disparity and disparity confidence values separately for horizontal and vertical pairs after applying a notch filter to improve an extraction of linear foreground features of the scene over a textured background;
extracting full two-dimensional locations of local maximums of each of four pairs for a purpose of a misalignment correction of a individual images;
extracting the disparity and disparity confidence values for combined horizontal and a 2d vector (X, Y) for combined vertical pairs for measuring velocities and compensating electronic rolling shutter distortions.

3. The multi-view stereo method according to claim 2, wherein the four individual images are combined into a single RGBA lapped texture tile by averaging matched pixels and making mismatched pixels transparent by reducing an alpha-channel value.

4. The multi-view stereo method according to claim 3 further including a sum of squared differences (SSD) between the image tile pixels and texture averaged pixels is output for each of the individual images, allowing a fast coarse evaluation of a disparity space image (DSI) and processing of only the occupied DSI voxels at a pixel level.

* * * * *